United States Patent
Nakamoto

(10) Patent No.: US 10,894,565 B2
(45) Date of Patent: Jan. 19, 2021

(54) VEHICLE FRONT STRUCTURE HAVING HOOD LOCK CABLE ROUTING STRUCTURE

(71) Applicant: Toyota Jidosha Kabushiki Kaisha, Toyota (JP)

(72) Inventor: Tomoo Nakamoto, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 133 days.

(21) Appl. No.: 16/214,506

(22) Filed: Dec. 10, 2018

(65) Prior Publication Data
US 2019/0185066 A1 Jun. 20, 2019

(30) Foreign Application Priority Data
Dec. 15, 2017 (JP) .................. 2017-240933

(51) Int. Cl.
| | | |
|---|---|---|
| *B62D 25/12* | (2006.01) | |
| *B62D 25/08* | (2006.01) | |
| *E05B 83/24* | (2014.01) | |
| *E05B 77/44* | (2014.01) | |
| *E05B 79/20* | (2014.01) | |

(52) U.S. Cl.
CPC .......... *B62D 25/12* (2013.01); *B62D 25/084* (2013.01); *E05B 77/44* (2013.01); *E05B 79/20* (2013.01); *E05B 83/24* (2013.01)

(58) Field of Classification Search
CPC ...... B62D 25/12; B62D 25/084; B62D 83/24; B62D 77/44; B62D 79/20
See application file for complete search history.

(56) References Cited

U.S. PATENT DOCUMENTS

2003/0080572 A1* 5/2003 So .................. F16C 1/101
292/336.3

FOREIGN PATENT DOCUMENTS

JP 2007106329 A 4/2007

* cited by examiner

*Primary Examiner* — D Glenn Dayoan
*Assistant Examiner* — Melissa Ann Bonifazi
(74) *Attorney, Agent, or Firm* — Dinsmore & Shohl LLP

(57) ABSTRACT

A vehicle front structure includes: an upper section that extends in a vehicle width direction and supports an upper portion of a radiator body; a latch structure that is attached to an upper portion of the upper section and locks a hood in a closed state; and a cable that is coupled to the latch structure and is used to operate the latch structure. At least two projections, each of which is projected to the rear of a vehicle and extends in the vehicle width direction, are provided on a vehicle rear surface of the upper section. The cable is arranged in a space that is defined by the two projections and the vehicle rear surface of the upper section. In this way, it is possible to provide the vehicle front structure capable of suppressing increases in mass and cost while preventing access to the cable.

2 Claims, 6 Drawing Sheets

VEHICLE FRONT STRUCTURE HAVING HOOD LOCK CABLE ROUTING STRUCTURE

CROSS REFERENCE TO RELATED APPLICATION

This application claims priority to Japanese Patent Application No. 2017-240933 filed on Dec. 15, 2017, which is incorporated herein by reference in its entirety including the specification, claims, drawings, and abstract.

TECHNICAL FIELD

The present disclosure relates to a vehicle front structure provided with a hood lock cable routing structure in a radiator support.

BACKGROUND

With regard to a vehicle front structure, a technique of providing a front hood opening/closing, structure on an upper portion of a radiator support, for supporting a radiator body has been known. An example of the front hood opening/closing structure is a latch nature that is engaged with a striker provided on a front hood. In this case, if a hood lock cable used for operation of the hood opening/closing structure can be accessed by lingers or a tool through a clearance between the front hood and a vehicle body or an opening in a grille at the front of the vehicle, the front hood can possibly be opened for vehicle theft.

A vehicle front end module structure is described in JP 2007-106329 A. The vehicle front end module structure includes: a front end module frame body that supports a radiator core; a latch mechanism attached to an upper portion of the front end module frame body; a latch cable coupled to the latch mechanism; and a fraudulent operation restricting section such as a first obstruction plate that is adjacent to the latch mechanism, is projected from an upper surface of the front end module frame body, and covers the latch cable from a front side of the vehicle so as to prevent fraudulent operation of the latch mechanism from the outside.

SUMMARY

Technical Problem

The protector member that prevents the access to a hood lock cable (the latch cable) is additionally provided in the front end module structure described in JP 2007-106379 A. However, such addition of the member is considered to be a cause of increased mass and increased cost.

The present disclosure has a purpose of providing a vehicle front structure capable of suppressing increases in mass and cost related to a vehicle while preventing access to a hood lock cable.

Solution to Problem

A vehicle front structure according to the present disclosure includes: a radiator support upper that extends in a vehicle width direction and supports an upper portion of a radiator body, a hood opening/closing structure that is attached to an upper portion of the radiator support upper and locks a hood in a closed state; and a hood lock cable that is coupled to the hood opening/closing structure and is used to operate the hood opening/closing structure. At least two projections, each of which is projected to the rear of a vehicle and extends in the vehicle width direction, are provided on a vehicle rear surface of the radiator support upper, and the hood lock cable is arranged in a space that is defined by the two projections and the vehicle rear surface of the radiator support upper.

In the present disclosure, a guide member may be provided to restrict movement of the hood lock cable, which is arranged in the space, to the rear of the vehicle. In the present disclosure, the radiator support upper and the projections may each be made of a resin, and the radiator support upper and the protections may be integrally molded.

The hood lock cable is arranged in the space defined by the two projections, each of which is provided on, the vehicle rear surface of the radiator support upper, is projected to the rear of the vehicle, and extends in the vehicle width direction, and the vehicle rear surface of the radiator support upper. In this way, it is possible to prevent access to the hood lock cable from a front side of the vehicle front structure, such as an opening in a grille, by using the radiator support upper. Thus, there is no need to add a protector member or the like that prevents the access to the hood lock cable. Therefore, it is possible to suppress increases in vehicle mass and vehicle cost caused by addition of the member.

BRIEF DESCRIPTION OF DRAWINGS

Embodiment(s) of the present disclosure will be described based on the following figures, wherein.

DESCRIPTION OF EMBODIMENTS

A detailed description will hereinafter be given of an embodiment according to the present disclosure with reference to the drawings.

Figure 1:
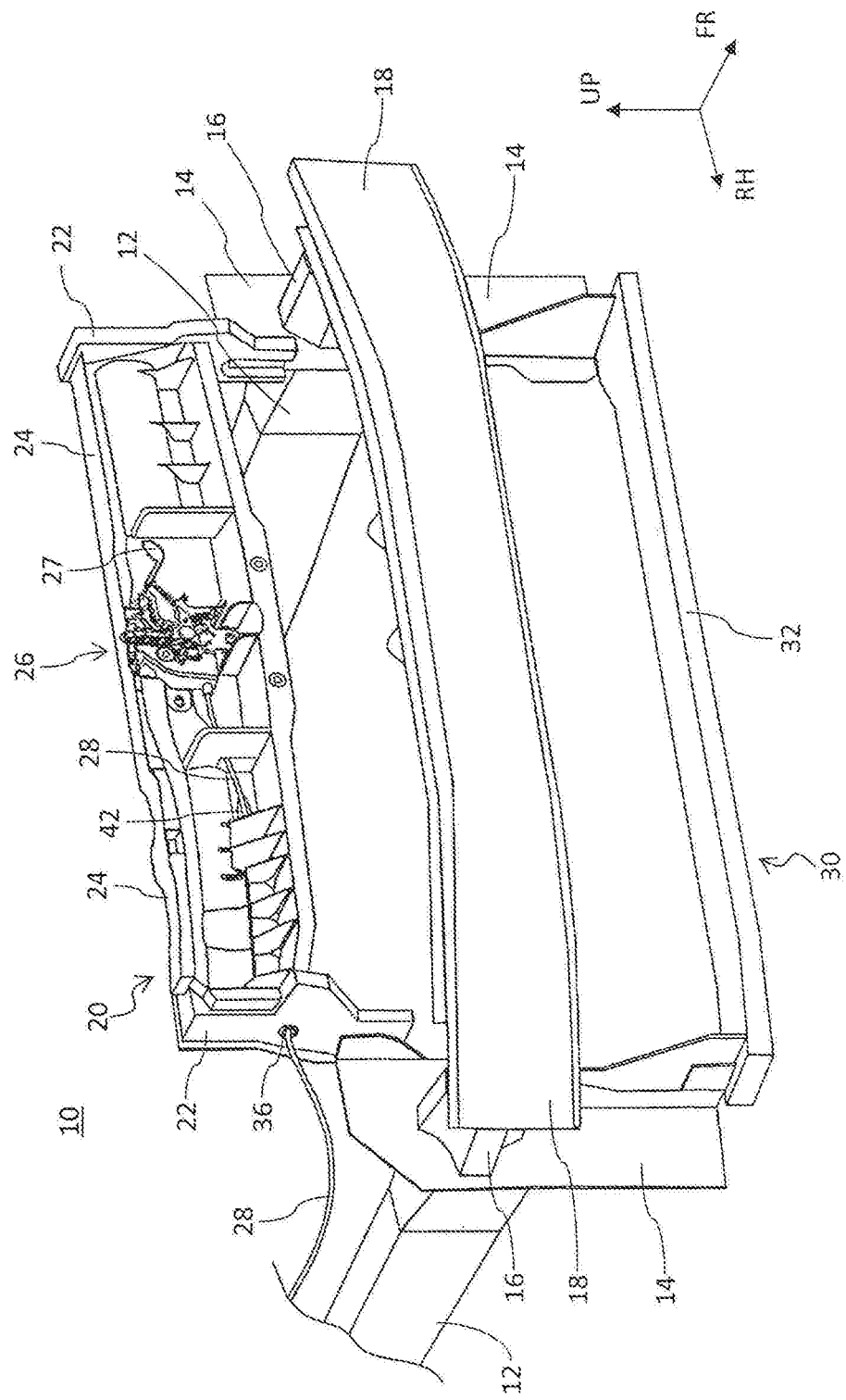
FIG. 1 is a perspective view of a schematic configuration of a vehicle front structure according to an example of an embodiment.
Figure 2:
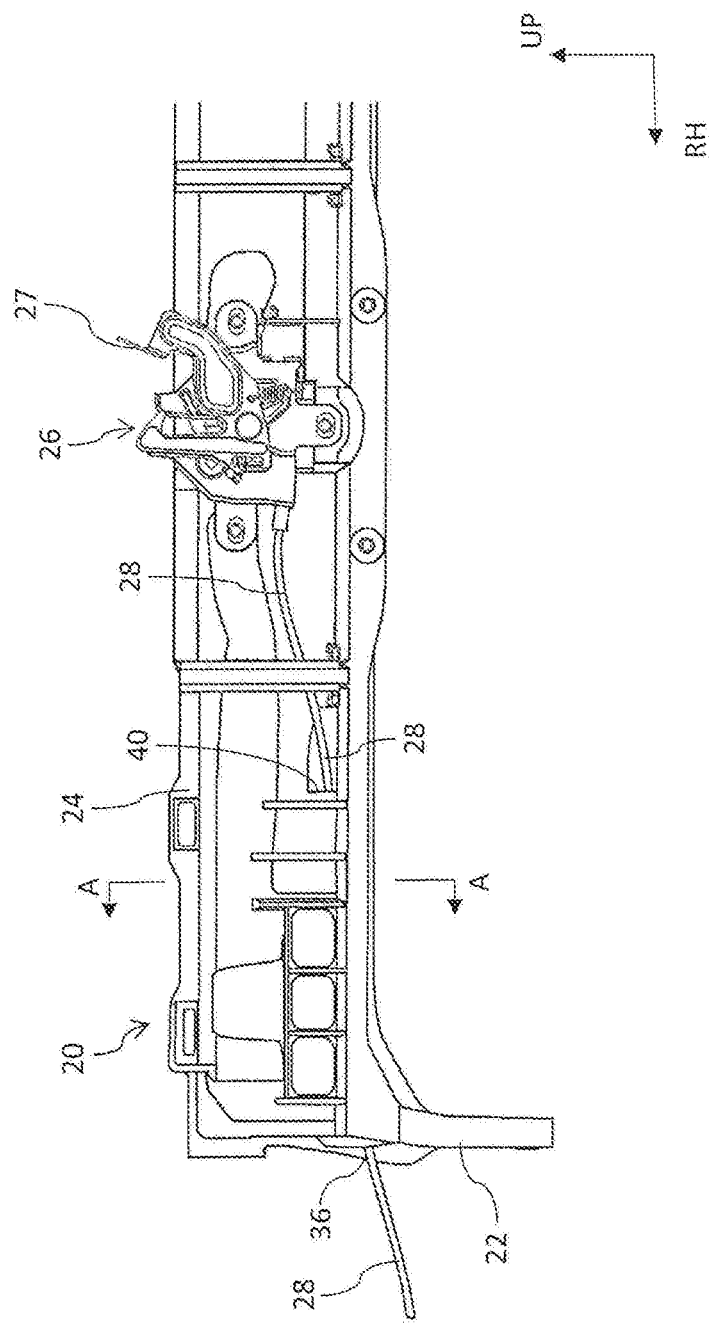
FIG. 2 is a front view of the schematic configuration of the vehicle front structure according to the example of the embodiment.
Figure 3:
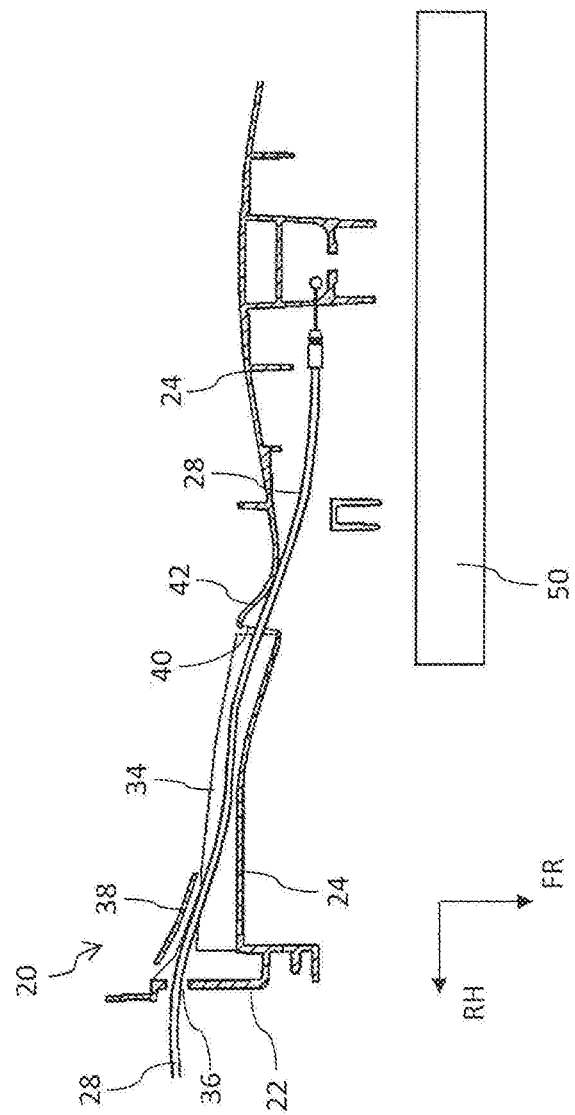
FIG. 3 is a schematic cross-sectional view of a hood lock cable routing structure.
Figure 4:
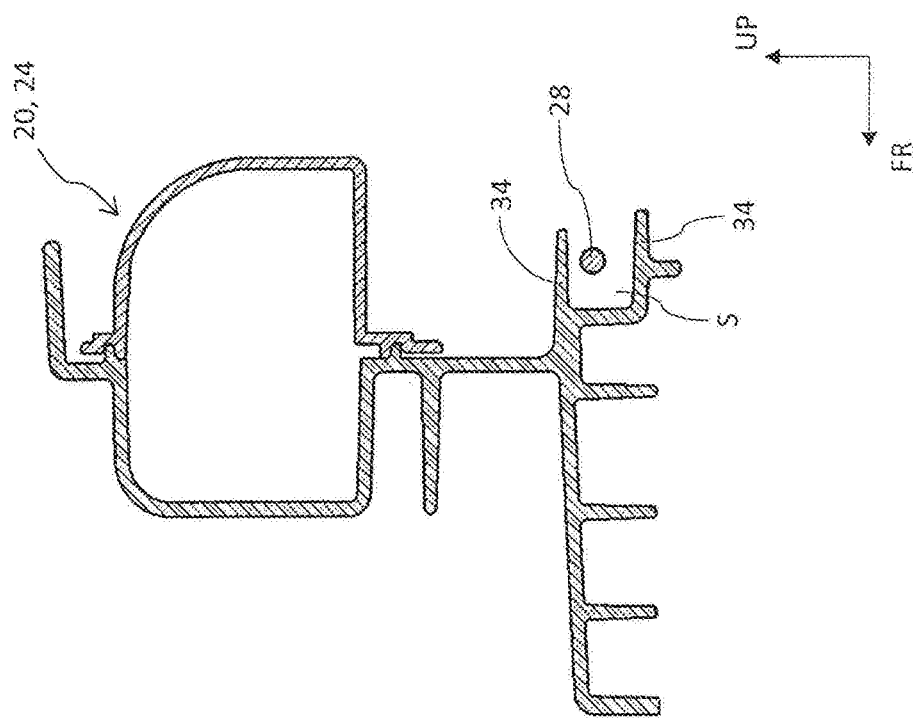
FIG. 4 is a schematic cross-sectional view that is taken along line A-A in FIG. 2.

FIG. 1 is a perspective view of a configuration of a vehicle front structure according to this embodiment. FIG. 2 is a front view of the configuration of the vehicle front structure according to this embodiment. FIG. 3 is a schematic cross-sectional view of a hood lock cable routing structure according to this embodiment. FIG. 4 is a partial cross-sectional view that is taken along line A-A, in FIG. 2, and illustrates arrangement of a hood lock cable in a radiator support upper. Note that a direction of an arrow RH illustrated in the drawings is a right direction of a vehicle, a direction of an arrow UP illustrated in the drawings is an up direction of the vehicle, and a direction of an arrow FR illustrated in the drawings is a front direction of the vehicle. In the following description, terms indicative of directions such as front, rear, left, right, up, and down each express the direction relative to the vehicle unless otherwise noted.

As illustrated in FIG. 1, a front side member 12 that extends along a longitudinal direction is disposed on each side of a vehicle front structure 10. Each of the front side members 12 is constructed of a vehicle frame member that has substantially rectangular cross sections along a substantially vehicle width direction and a substantially vehicle vertical direction. A crash box 16 as a shock absorbing member is provided on a front side of a front end of each of the front side members 12 via a reinforcing plate 14. Each of the crash boxes 16 has a cylindrical section that is arranged in substantially the vehicle longitudinal direction. When receiving a collision load, each of the crash boxes 16 is compressed and deformed in an axial direction and thereby absorbs collision energy.

A bumper reinforcement 18 is arranged in a position at the front of the vehicle front structure 10 and on front ends of the crash boxes 16. The bumper reinforcement 18 extends along the vehicle width direction, and runs across the front ends of a right and left pair of the crash boxes 16. The bumper reinforcement 18 is a metallic bumper frame member and has a curved shape such that a center portion in the vehicle width direction is projected to a front side of the vehicle from each end in the vehicle width direction.

The vehicle front structure. 10 is provided with a radiator support that supports a radiator body (not illustrated). The radiator support is configured to include: a radiator support upper (hereinafter described as an upper section) 20 that supports an upper portion of the radiator body; and a radiator support lower (hereinafter described as a "lower section") 30 that supports a lower portion of the radiator body. As illustrated in FIG. 1, the upper section 20 and the lower section 30 are arranged separately (separately and independently) from each other and are not directly coupled to each other.

The upper section 20 of the radiator support includes a right and left pair of side walls 22 and an upper section body 24. The side walls 22 are fixed to the reinforcing plates 14, which are respectively joined to the front ends of the front side members 12 on both of the sides in the vehicle width direction. The upper section body 24 runs across upper portions of these side walls 22 substantially along the vehicle width direction. In this embodiment, the upper section 20 is made of a resin. The right and left pair of the side walls 22 and the upper section body 24 are integrally molded. Each of the side walls 22 is fixed to the reinforcing plate 14 by a fastener including a bolt and a nut. Note that the fastener including the bolt and the nut is not illustrated in the drawings. In addition, a shape of each of the side walls 22 and a shape of the upper section body 24 are not limited to shapes in this embodiment but can be changed.

The lower section 30 of the radiator support is fixed to the reinforcing plates 14, which are joined to the from ends of the front side members 12 on both of the sides in the vehicle width direction. The lower section 30 of the radiator support extends along the vehicle width direction and has a lower section body 32 that has a substantially rectangular shape and supports the radiator body from below. In this embodiment, the lower section 30 is formed of a metal plate such as a steel plate.

A latch structure 26 is attached to a center of an upper portion of the upper section body 24 in the vehicle width direction. The latch structure 26 serves as a hood opening/closing structure that locks an unillustrated front hood in a closed state. The latch structure 26 locks an unillustrated striker that is provided on a lower surface at a front edge of the front hood in a manner to allow locking/unlocking thereof, and the front hood is disposed to cover the vehicle front structure 10 from above. One end of a hood lock cable (hereinafter simply described as a "cable") 28 is coupled to a lateral surface of the latch structure 26, and the cable 28 is used for an unlocking operation of the latch structure 26 from a vehicle cabin side. In addition, an operation lever 27 that releases a locked state of the latch structure 26 is fixed thereto in a manner to be projected to the front side of the vehicle. Since a structure of the latch structure 26 is well-known, detailed description thereof will not be given. Once the latch structure 26 is engaged with the striker and brought into the locked state, the locked state thereof is maintained unless the cable 28 is pulled.

As illustrated in FIG. 2 and FIG. 3, the cable 28 that extends in the vehicle width direction is arranged in a right portion of the upper section 20. As described above, a left end of the cable 28 is coupled to the lateral surface of the latch structure 26. Meanwhile, the cable 28 that is inserted through a first routing opening 36 provided in the right side wall 22 and is drawn from the upper section 20 extends along an upper side of the right front side member 12 and is drawn into the vehicle cabin. The other end of the cable 28 is coupled to an unlocking lever in the vehicle cabin. When this unlocking lever is operated from a driver seat and the cable 28 is pulled, the locked state of the latch structure 26 is released.

A detailed description will now be given of a routing structure of the cable 28 in the upper section 20 with reference to FIG. 2 to FIG. 4. In the upper section 20, the cable 28 has the routing structure in which the cable 28 is inserted through the first routing, opening 36 in the side wall 22, is routed to a rear surface side of the upper section body 24, and extends in the vehicle width direction. As illustrated in FIG. 3 and FIG. 4, the rear surface of the upper section body 24 is provided with two projections 34, each of which is projected to the rear of the vehicle and extends in the vehicle width direction. In this embodiment, as illustrated in FIG. 3, the two projections 34 are provided to vertically hold the cable 28 therebetween in a range where the cable 28 is routed to the rear surface side of the upper section body 24, that is, a substantially entire range from the first routing opening 36 to a second routing opening 40. Each of these projections 34 is made of the resin and is integrally molded with the upper section 20 (the side wall 22 and the upper section body 24). A space S that has a substantially rectangular cross section and extends in, the vehicle width direction is defined by these two projections 34 and the rear surface of the upper section body 24, and the cable 28 is arranged in the space S. As described, since the cable 28 is arranged on the rear surface side of the upper section body 24, the cable 28 is prevented from being accessed from a front side of the vehicle front structure 10, for example, from an opening in a grille or the like.

In addition, as illustrated in FIG. 3, a first guide member 38 in a shape of covering the space S from behind is vertically provided in a position at the rear of the upper section body 24 and near the first routing opening 36. The first guide member 38 extends along the rear surface of the upper section body 24 from the position near the first routing opening 36 to the left in the vehicle width direction. In this way, at the position near the first routing opening 36, the first guide member 38 restricts rearward movement of the cable 28 in the space S.

A left side (a center side in the vehicle width direction) of the space 5, which is defined by the two projections 34 and the rear surface of the upper section body 24, is connected to the second routing opening 40 provided in the upper section body 24. As illustrated in FIG. 3, the second routing opening 40 is opened in the vehicle width direction so as to receive the cable 28. In addition, a second guide member 42 is formed on a left side of the second routing opening 40, and the second guide member 42 has such a shape that a part of the upper section body 24 is indented to the rear side. In this way, the cable 28 is inserted through the second routing opening 40, and a rear side thereof is restricted by the second guide member 42. In this way, the cable 28 is drawn from the space S on the rear surface side of the upper section body 24 to a front surface side of the upper section body 24. The cable 28, which is located on the front surface side of the upper section body 24, extends along the second guide member 42 to the center of the upper section body 24 in the vehicle width direction, and a tip of the cable 28 is coupled to the lateral surface of the latch structure 26. Note that in this embodiment, the second guide member 42 also constitutes the guide member.

In the vehicle front structure 10 of this embodiment, as illustrated in FIG. 3, a duct upper cover 50 is arranged in front of a range between the second routing opening 40 of the upper section 20 and the latch structure 26. In this way, in the range between the second routing opening 40 and the latch structure 26, the cable 28, which is arranged on the front surface side of the upper section body 24, is prevented from being accessed from the opening in, the grille or the like.

Figure 5:
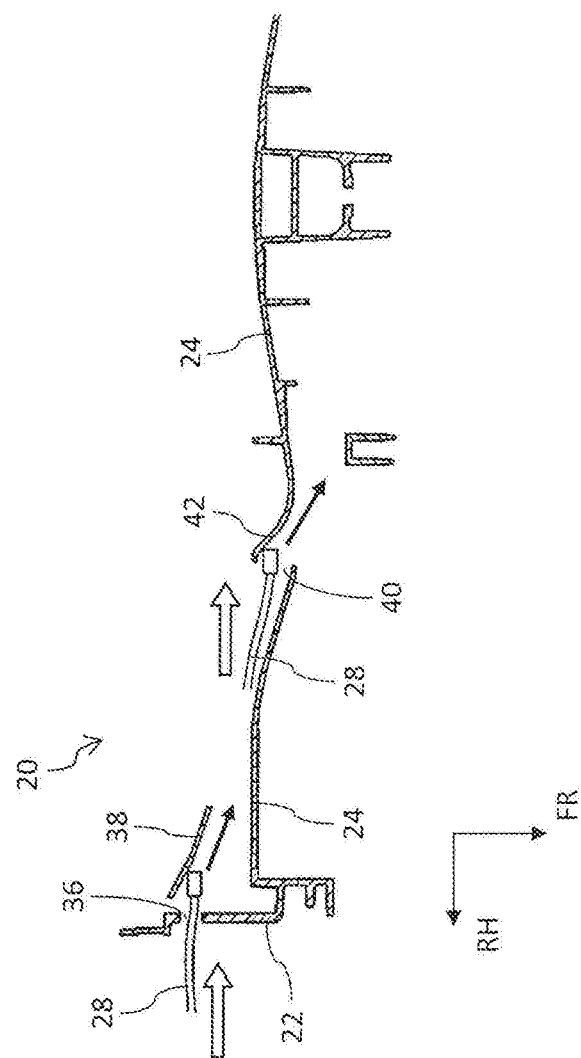
FIG. 5 is an exemplary view of routing work of a hood lock cable.

Here, a description will be given of an example of routing work for routing the cable 28 in the vehicle front structure 10 according to this embodiment with reference to FIG. 5. Note that only a cross section of the upper section 20 is illustrated in FIG. 5 for explanation. The end of the cable 28, which is routed to the upper section 20, is coupled in advance to the unlocking lever provided in the vehicle cabin. Then, the cable 28 is drawn along the upper side of the right front side member 12. Next, the tip of the cable 28 is inserted through the first routing opening 36, which is provided in the right side wall 22 of the upper section 20. At this time, once the cable 28 is pushed in from the first routing opening 36 along a direction indicated by an, arrow a1 in FIG. 5, the tip of the pushed cable 28 hits the first guide member 38 provided near the first routing opening 36 and advances in a direction indicated by an arrow b1. In this way, the cable 28 is restricted such that a route thereof does not deviate rearward from the space S provided by the rear surface of the upper section body 24 and the two projections 34. Similarly, the cable 28 is restricted such that the route thereof to a front side of the space S is restricted by the rear surface of the upper section body 24 and the route thereof in the vertical direction of the space S is restricted by the two projections 34.

When the cable 28 is further pushed in, the tip of the cable 28 that advances in the space S reaches the second routing opening 40 at a left end of the space S. Then, when the cable 28 is pushed in to the left from the second routing opening 40 along a direction indicated by an arrow a2 in FIG. 5, the tip of the cable 28 hits the second guide member 42 and is forcibly pushed to the front surface side of the upper section body 24 (in a direction indicated by an arrow b2). Next, the cable 28 keeps being pushed until the tip of the cable 28 reaches the center of the upper section body 24 in the vehicle width direction. Thereafter, in a state where the duct upper cover 50 is not provided, work of coupling the tip of the routed cable 28 to the lateral surface of the latch structure 26 is performed from the front side of the vehicle front structure 10, with regard to the vehicle front structure 10 according to this embodiment, it is possible to easily perform the routing work of the cable 28 through the specified space S on the rear surface side of the upper section 20, which is difficult to access, simply by pushing in the cable 28 from a lateral surface of the upper section 20. Therefore, for example, the cable routing work that does not rely on a worker's, experience can be promptly performed on an operating assembly line. Thereafter, the duct upper cover 50 is attached.

Next, a description will be given of operations and effects of the vehicle front structure 10 according to this embodiment.

In this embodiment, the cable 28 is arranged in, the space S defined by the two projections 34, each of which is provided on the rear surface of the upper section 20, is projected to the rear of the vehicle, and extends in the vehicle width direction, and the rear surface of the upper section 20, in this way, the cable 28 is prevented from being accessed from the front side of the vehicle front structure 10 such as the opening in the grille. As the structure for preventing the access to the cable 28, for example, it is considered to additionally provide a protector member for the cable 28, which is routed on a front surface of the upper section 20. However, in this case, the addition of the member increases vehicle mass and vehicle cost. Meanwhile, in the vehicle front structure 10 of this embodiment, the cable 28 is arranged in the space S that is defined by the rear surface of the upper section 20 and the two projections 34. Thus, it is possible to suppress the increases in the vehicle mass and the vehicle cost, which are caused by the addition of the member, while preventing the access to the cable 28 by using the upper section 20.

As described above, the locked state of the hood opening/closing structure such as the latch mechanism is released when the unlocking lever is operated from the driver seat and a hood lock cable is pulled. Meanwhile, in the cases where the hood lock cable is arranged on a vehicle rear surface side of the radiator support and where the vehicle receives an impact from the front at the time of a vehicle collision or the like, the radiator support possibly moves rearward. At this time, it is considered that the hood lock cable may possibly be caught between the radiator support and an engine room component arranged at the rear of the radiator support. When the hood lock cable is caught, an external force that pulls the hood lock cable may be applied thereto. As a result, the locked state of the hood opening/closing structure may be released, and the front hood may be opened.

Figure 6:
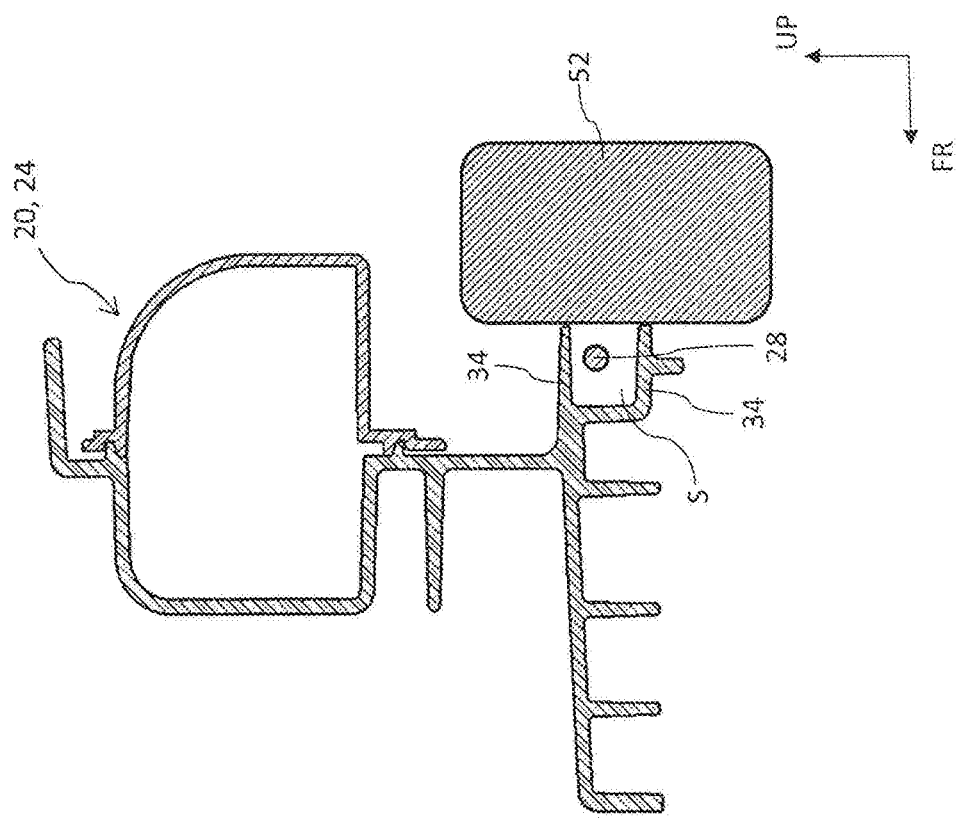
FIG. 6 is a view of a structure including the hood lock cable and a periphery thereof at the time of a vehicle collision.

On the contrary, in the vehicle front structure 10 of this embodiment, the cable 28 is arranged in the space S defined by the two projections 34, each of which is projected from the rear surface of the upper section 20, and the rear surface of the upper section 20. FIG. 6 is a view of the cable 28 and a structure of a periphery thereof in the vehicle front structure 10 of this embodiment at the time when the upper section 20 comes in contact with an engine room component 52 during the vehicle collision. As illustrated in FIG. 6, in the vehicle front structure 10 of this embodiment, even in the case where the upper section 20 comes in contact with the engine room component 52 during the vehicle collision, due to provision of the two projections 34, each of which extends to the rear from the rear Surface of the upper section 20, a saving space by the space S is secured around the cable 28. Thus, it is possible to reliably prevent such a situation where the cable 28 is caught between the upper section 20 and the engine room component 52, the cable 28 is thereby pulled, the locked state of the latch structure 26 is consequently released, and the front hood is opened.

Furthermore, in the vehicle front structure 10 of this embodiment, the space S, in which the cable 28 is arranged, is covered with the upper section 20 including the projection 34 from above. Thus, even when the front hood is in, an opened state, the cable 28 is not visually recognized from a position above the vehicle front structure 10, and appearance from the position above the vehicle front structure 10 is improved.

As, in this embodiment, in the case where the cable 28 is routed to the rear surface side of the upper section body 24 from one of the side walls 22 of the upper section 20 and is then routed to the front surface side of the upper section body 24 during assembly of the vehicle front structure 10, it is difficult to visually recognize and access to the rear surface side of the upper section body 24. Thus, it is difficult to route the cable 28 as desired. Meanwhile, in this embodiment, the vehicle front structure 10 is provided with the two projections 34, each of which is projected from the rear surface of the upper section body 24; the first guide member 38 that covers the space S from behind at the position near the first routing opening 36; and the second guide member 42 that is formed on the left side of the second routing opening 40. In this way, in the routing work of routing the tip of the cable 28 from one of the side walls 22 of the upper section 20 to the center in the vehicle width direction on the front surface side of the upper section body 24 through the rear surface side of the upper section body 24, the vertical, movement of the cable 28 is restricted by the two projections 34, and the rearward movement of the cable 28 is restricted by the first guide member 38 and the second guide member 42. Accordingly, in the vehicle front structure 10 of this embodiment, it is possible to route the cable 28 in the specified space S on the rear surface side of the upper section 20 by simply pushing in the cable 28 from the lateral surface of the upper section 20. As described, the vehicle front structure 10 of this embodiment allows the prompt cable routing work that does not rely on the worker's experience. Thus, the vehicle front structure 10 of this embodiment is suited for assembly on the assembly line.

Moreover, in the ease where the hood lock cable is conventionally arranged along the radiator support, a fixture component such as a clamp is necessary to fix the hood lock cable, so as to prevent the hood lock cable from hanging down or being caught by a peripheral component during travel. Meanwhile, in the vehicle front structure 10 of this embodiment, the cable 28 is arranged in the space S that is defined by using a shape of the upper section 20, and the longitudinal movement and the vertical movement of the cable 28 are restricted. Thus, it is possible to suppress the increases in the mass and the cost caused by the addition of the fixture component while preventing the cable 28 from hanging down or being caught by the peripheral component during the travel.

In this embodiment, the side walls 22 and the upper section body 24, which constitute the upper section 20, and the two projections 34, each of which is projected to the rear from the rear surface of the upper section body 24 and extends in the vehicle width direction, are each made of resin and are integrally molded. Since the side walls 22, the upper section body 24, and the projections 34 are integrally-molded resin members, it is possible to further reduce the mass.

Note that the configuration described above is merely one example, and the configuration can be appropriately changed as long as the upper section 20 according to this embodiment is at least provided with the two projections 34, each of which is projected to the rear from the rear surface of the upper section 20 and extends in the vehicle width direction, and the cable 28 is arranged in the space S that is defined by these projections 34 and the rear surface of the upper section 20. In the above description, the radiator support has the structure in which the upper section 20 and the lower section 30 are separately arranged from each other. However, the radiator support may have a right and left pair of side sections constituting the rectangular frame-shaped radiator support. The right and left pair of the side sections is arranged on the right and left sides of the radiator body, extends vertically, has upper ends that are joined to the upper section, and has lower ends that are joined to the lower section. In addition, in the above description, the upper section 20 is constructed of the resin members. However, the upper section 20 may be constructed of metal members such as steel plates. Furthermore, in the above description, the latch structure 26 is exemplified as the hood opening/closing structure. However, the hood opening/closing structure may be another locking structure that locks the front hood in the closed state and can release the locked state by the unlocking operation using the cable 28 from the vehicle cabin side.

Note that the present disclosure is not limited to the embodiment that has been described so far, and includes all changes and modifications that do not depart from the technical scope and the essence of the present disclosure defined by the claims.

The invention claimed is:

1. A vehicle front structure comprising:
   a radiator support upper that extends in a vehicle width direction and supports an upper portion of a radiator body;
   a hood opening/closing structure that is attached to an upper portion of the radiator support upper and locks a hood in a closed state; and
   a hood lock cable that is coupled to the hood opening/closing structure and is used to operate the hood opening/closing structure, wherein
   at least two projections, each of which is projected to the rear of a vehicle and extends in the vehicle width direction from an end in the vehicle width direction toward a center in the vehicle width direction, are provided on a vehicle rear surface of the radiator support upper,
   the hood lock cable is arranged in a space that is defined by the two projections and the vehicle rear surface of the radiator support upper, and
   a guide member is provided to restrict movement of the hood lock cable, which is arranged in the space, to the rear of the vehicle, wherein
   the guide member is arranged rearward of a routing opening that is opened toward the center in the vehicle width direction at ends on a center side in the vehicle width direction of the at least two projections.

2. The vehicle front structure according to claim 1, wherein
   the radiator support upper and the two projections are each made of a resin, and
   the radiator support upper and the two projections are integrally molded.

* * * * *

UNITED STATES PATENT AND TRADEMARK OFFICE
CERTIFICATE OF CORRECTION

Page 1 of 1

PATENT NO. : 10,894,565 B2
APPLICATION NO. : 16/214506
DATED : January 19, 2021
INVENTOR(S) : Tomoo Nakamoto It is certified that error appears in the above-identified patent and that said Letters Patent is hereby corrected as shown below:

In the Specification

In Column 1, Line(s) 22, after "opening/closing", delete ",".

In Column 1, Line(s) 23, after "support", delete ",".

In Column 2, Line(s) 16, after "on", delete ",".

In Column 2, Line(s) 60, after "A-A", delete ",".

In Column 4, Line(s) 32, after "routing", delete ",".

In Column 4, Line(s) 47, after "in", delete ",".

In Column 4, Line(s) 66, after "space", delete "5" and insert --S--, therefor.

In Column 5, Line(s) 27, after "in", delete ",".

In Column 5, Line(s) 41, after "an", delete ",".

In Column 6, Line(s) 6, after "worker's", delete ",".

In Column 6, Line(s) 12, after "in", delete ",".

In Column 7, Line(s) 4, after "in", delete ",".

In Column 7, Line(s) 27, after "vertical", delete ",".

In Column 7, Line(s) 40, delete "ease" and insert --case--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*